May 14, 1968 R. A. SPARKS ET AL 3,383,632

FERRIMAGNETIC ACOUSTIC MICROWAVE DELAY LINE

Filed Oct. 11, 1965 2 Sheets-Sheet 1

INVENTORS
RICHARD A. SPARKS
EDGAR L. HIGGINS

BY Alfred B. Levine
ATTORNEY

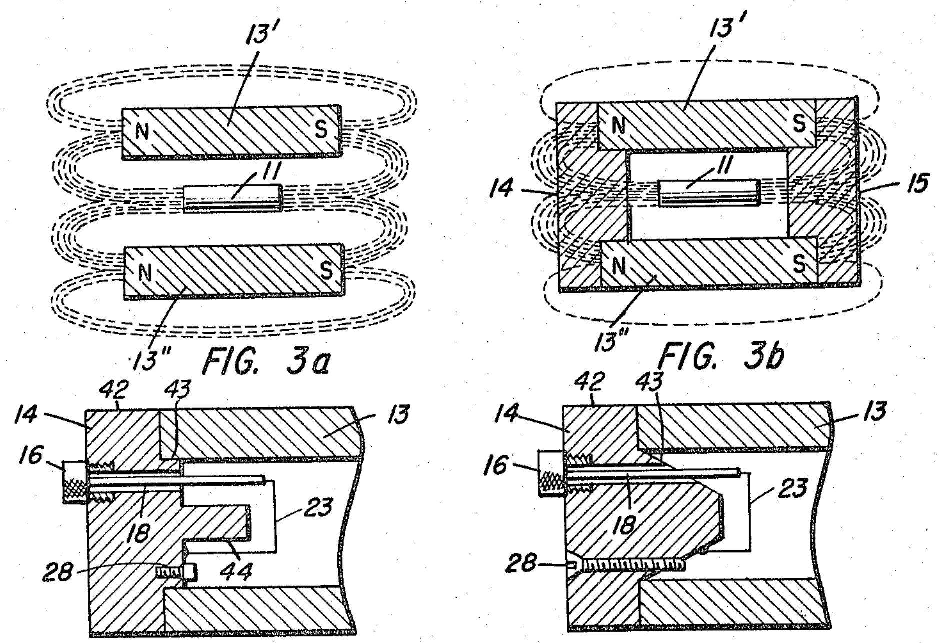
FIG. 3a FIG. 3b
FIG. 4a FIG. 4b
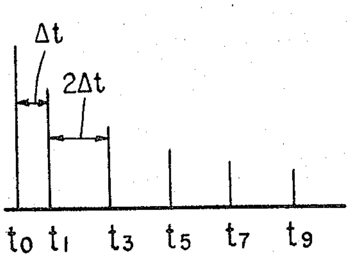
FIG. 2
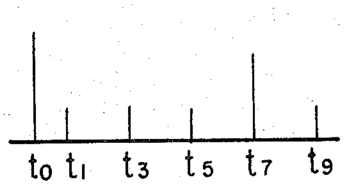
FIG. 5
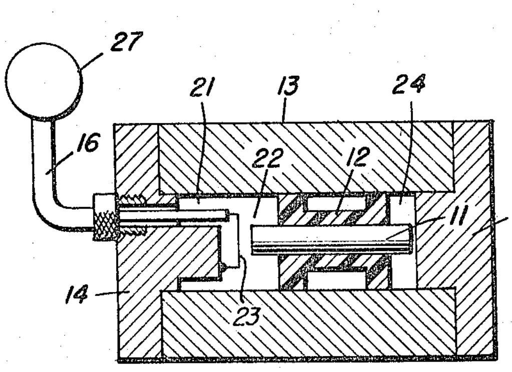
FIG. 6
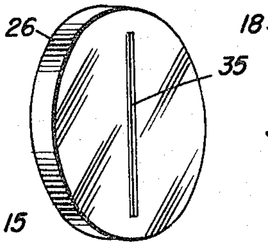
FIG. 8a
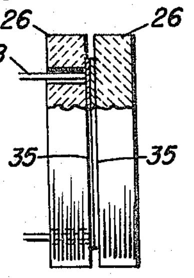
FIG. 8b
INVENTORS
RICHARD A. SPARKS
EDGAR L. HIGGINS
BY Alfred B. Levine
ATTORNEY 3,383,632
Patented May 14, 1968

3,383,632

FERRIMAGNETIC ACOUSTIC MICROWAVE DELAY LINE

Richard A. Sparks, Silver Spring, and Edgar L. Higgins, Hyattsville, Md., assignors to Litton Systems, Inc., Silver Spring, Md.

Filed Oct. 11, 1965, Ser. No. 494,461
10 Claims. (Cl. 333—30)

ABSTRACT OF THE DISCLOSURE

A single crystal delay line for microwaves characterized by being biased by a permanent magnet and providing increased preselected time delays by optimally coupling to given ones of direct or internally reflected waves.

The present invention relates to a delay line and more particularly to a ferrimagnetic crystal delay line.

Delay devices have been fabricated in the past utilizing ferrimagnetic crystals placed in a magnetic field. Among many factors, the frequency of operation of such devices is dependent upon the strength of the effective magnetic field applied to the crystal which field must be of such magnitude as to bias the surface of the crystal close to ferrimagnetic resonance.

State-of-the-art devices of this type have utilized large electromagnets to produce a field of sufficient strength to operate within the microwave frequency range. Such devices have been impractical because of their large size and high power requirements. Further, devices of this type have generally been operated at temperatures below 20° K. to minimize dissipative losses.

The present invention contemplates a novel combination of permanent magnet and focusing means to direct substantially all of the magnetic flux from the permanent magnet across a ferrimagnetic crystal, thereby providing a delay line which requires no external source of biasing power; is compact in size, possesses the qualities of reliability, durability, and the like, of present day solid state devices; and, is operable at normal room temperature.

An object of the present invention is the provision of a miniaturized delay line capable of operation well within the microwave frequency band.

Yet another object is the provision of a delay line of compact size and increased reliability utilizing a magnetic biasing arrangement requiring no external power source and operable at room temperature.

Still a further object of the invention is to provide a delay line substantially noise and distortion free.

These and other advantages of the invention will hereinafter become more fully apparent from the following description as illustrated in the accompanying drawings in which like reference numerals designate like parts throughout the figures thereof and wherein:

FIG. 2 is a graph of time versus amplitude of an input signal and output signal from the device;

Figure 7:
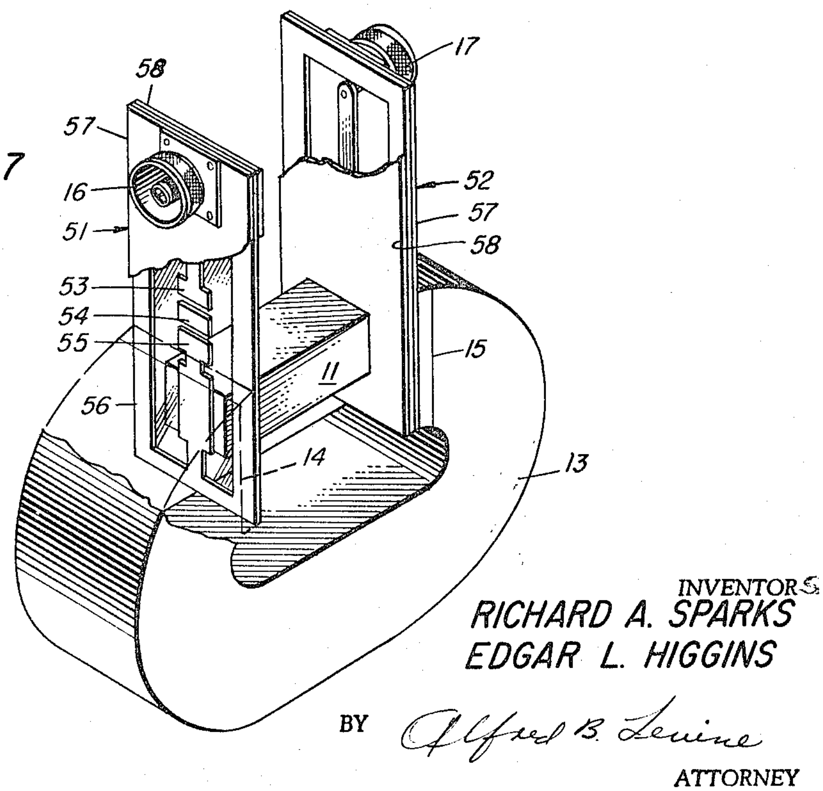

FIG. 3*a* depicts diagrammatically, the flux fields of a permanent magnet without re-entry pole pieces;

FIG. 3*b* depicts diagrammatically, the flux field emanating from a permanent magnet having re-entry pole pieces;

FIGS. 4*a* and 4*b* show other embodiments of re-entry pole pieces;

FIG. 5 is another graph of time versus amplitude of an input signal and output signal from the device;

FIG. 6 shows a plan view of an embodiment of the invention;

FIG. 7 illustrates by a phantom view another embodiment of the invention;

FIGS. 8*a* and 8*b* illustrate an energization wire loop contemplated for use in the device.

Figure 1:
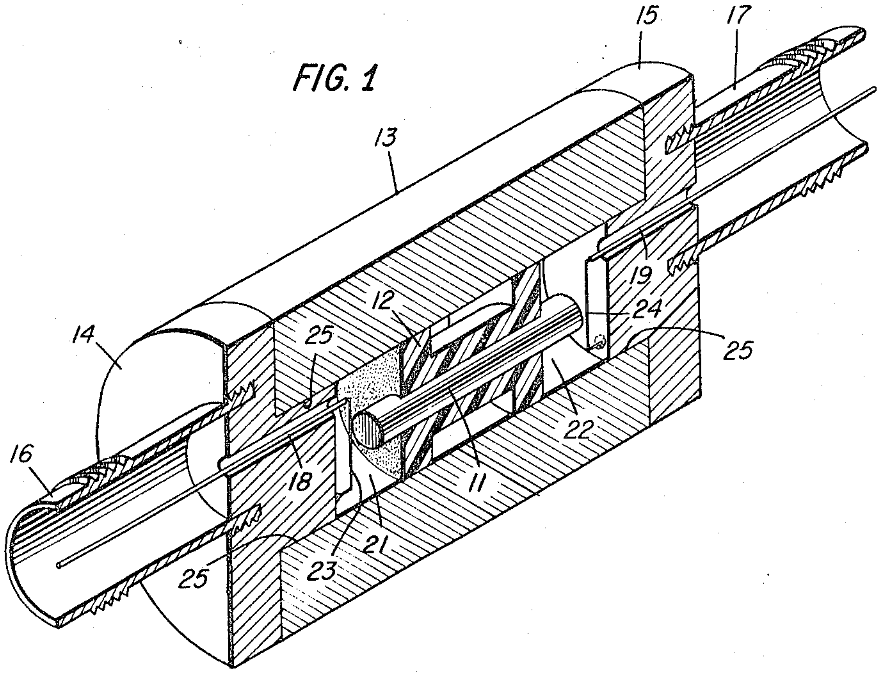
FIG. 1 shows a perspective sectional view of an embodiment of the invention.

Turning now to FIG. 1 there is shown a sectional view of an embodiment of the present invention having a synthetic ferrimagnetic single crystal rod or bar 11 supported in a spool shaped holder 12 which in turn is supported in a permanent magnet 13.

The crystal 11 may be made of any synthetic ferrimagnetic material, such as yttrium iron garnet (YIG); an yttrium iron garnet doped with a suitable metal such as gallium, aluminum and the like; hexagonal ferrites, such as lithium ferrite, zinc ferrite; or similar materials. Further, the crystal may assume any ellipsoidal shape (spherical, disc-shaped, or the like); or any "non-ellipsoidal" shape. The term "non-ellipsoidal" as applied to this art has grown to mean any quasi-ellipsoidal shape to the exclusion of grossly asymmetrical configurations.

The crystal holder 12 may be made of a cylinder of metallic material, such as brass, or may be of a dielectric material nylon for example, so long as the end faces are coated with a conductive material. Further in order that excessive weight may be eliminated, the holder may be spool shaped as that shown in FIG. 1. The magnet 13 may be made of materials such as Alnico alloys.

Each of the end faces of the magnet 13 are closed by re-entry pole pieces 14 and 15. An aperture is formed within the pole pieces to which coaxial cable connectors 16 and 17 are secured mechanically and electrically. Coaxial cable central conductors 18 and 19 are placed in these apertures. It is noted that cavities 21 and 22 are formed by the end faces of the pole pieces 14 and 15, portions of the interior surface of the magnet 13 and the end faces of the crystal 11 and holder 12. Fine wire loops 23 and 24 are placed in these cavities and are soldered on one end to the center conductors 18 and 19, respectively. The other end of the loops 23 and 24 are soldered to the interior faces of the pole pieces 14 and 15, respectively, to provide an electrical ground connection.

The crystal 11, by magnetostrictive process, acts as an electromagnetic energy to elastic vibrational energy converter or transducer. Thus, if a signal is injected into the device at connector end 16, it passes down the coaxial cable center connector 18 to the fine wire loop 23. The magnetic flux field from the permanent magnet 13 will bias the crystal 11 close to ferrimagnetic resonance. The electromagnetic energy is converted to elastic vibrational energy at the surface of the crystal and the elastic energy will propagate down the length of the crystal 11. A portion of the elastic vibrational wave will be transduced to electromagnetic energy at the far end of crystal 11 and will be coupled through wire 24 and conductor 19, to the output circuit appearing at connector 17. The remainder of the vibrational energy will be reflected from that end surface of the crystal and proceed to the crystal end surface adjacent wire loop 23. At this end the same process will occur. Reflection and conversion of the elastic wave energy will continue in this manner until the entire wave is dissipated.

Assume travel from one end surface of the crystal to another takes a finite period of time $\Delta t$, referring now to FIG. 2. An input signal appears at time $t_0$, at the input surface of crystal 11, later, at time $t_1$ the elastic vibration energy having traveled the length of the crystal, an output signal is present at connector 17 of less amplitude than the input signal. This signal is due to that portion of the wave that was coupled to the output loop 22. The remainder of the wave is reflected from the output end surface and returns to the input end surface.

A portion of the energy is coupled to the input and a portion is again reflected to the output end of the crystal. Thus at time $t_3$, $2\Delta t$ after time $t_1$, a further output signal is present at connector 17. This continues until all of the energy has been coupled to the wire loops 23 and 24 or is dissipated in the device.

As will be further discussed hereinafter, the amount of energy coupled between the crystal 11 at various time intervals and the wire loops 23 and 24 may be readily preadjusted, due to the structure utilized in this invention.

To further explain the novelty of the instant invention FIG. 3*a* depicts, schematically, the flux fields set up in a cylindrical permanent magnet without re-entry pole pieces. The cylindrical magnet 13 may be thought of as a series of bar type magnets corresponding to sections of a cylinder cut along the longitudinal axis. Two of such sections 13' and 13'' are shown in the figure with the crystal 11 between them. In a bar magnet as in the cylindrical permanent magnet, flux fields created by lines traveling from the north to the south poles are observed. Only a portion of the available flux will be present at the center of the cylinder. The fringing or loss flux establishing a field outside of the cylindrical surface, obviously, has no effect upon the crystal, thus, does not serve to bias the crystal. Prior to this invention, utilization of permanent magnets has been impractical in that the effective or useable flux field has been of insufficient magnitude to bias the crystal to resonance within normal frequency ranges. More powerful electromagnets have been utilized which greatly increase the size of the device and necessitate external power sources.

FIG. 3*b* shows the flux pattern established by the addition of re-entry pole pieces 14 and 15, which serve as a path of least reluctance to the previously lost magnetic flux lines, thereby focusing substantially all of the flux field in the area occupied by the crystal 11 and hence providing a more powerful effective magnetic field for biasing of the crystal. Thus practice of the invention permits the use of relatively small permanent magnets and materially decreases the size and weight of the device. Further, the end pieces completely eliminate the necessity of an electromagnet and an external power supply. In one device built in accordance with the teachings of the invention, utilizing a permanent magnet of Alnico I, and pole pieces of soft iron such as Armco iron, it has been found that the useable field strength may be increased to half again that present for effective crystal biasing without the use of the re-entry pole pieces. For example, utilizing a magnet roughly one inch in diameter and 1½ inches in length, absent re-entry pole pieces, an effective flux field of 1,000 gauss was measured. An effective field of approximately 1,500 gauss was observed when the pole pieces were utilized.

FIGS. 4*a* and 4*b* depict alternate configuration for the re-entry pole pieces 14 and 15. It has been found that a sizeable quantity of flux may leak at the permanent magnet-pole piece interfaces one of which designated by reference numeral 25 in FIG. 1. That is, flux emerging from the north pole region of the magnet 13 has a tendency to travel through the exposed surface of the pole pieces 14 and 15 and thereafter return directly to the magnet via interface 25. Hence, the flux does not pass through the crystal 11 and effectively shortens the length of the permanent magnet 13.

With smaller surface contact between pole pieces and magnet, fewer flux lines will take this path. By utilizing pole pieces generally of the configuration shown in FIGS. 4*a* and 4*b*, a minimum magnet-pole piece contact is created and hence smaller amounts of flux are lost via this path. An increase of approximately 10% more effective field has been noted using these configurations. Further, forming of the aperture in the pole pieces and connection of wire loop 23 to conductor 18 and ground is facilitated by these configurations.

FIG. 4*a* depicts a pole piece 14 having a series of stepped surfaces 42 to 44. The step 42 is dimensionally such that the largest diameter of the pole piece is equal to the outer diameter of the magnet 13 and step 43 permits a snug fit between the step and the inner diameter of the magnet. Of particular importance is the length of step 43 which minimizes the pole piece magnet interface 25. The step 44 provides for ease in the forming of the aperture through which conductor 18 is placed and facilitates ground connection and placement of screw 28.

FIG. 4*b* depicts a pole piece 14 having a surface 42 parallel to and coincident with the outer diameter of magnet 13, and a tapered surface 43. This configuration also provides the snug fit between magnet and pole piece, and further allows for minimal pole piece magnet interface 25, thereby increasing the effective length of the magnet.

As stated hereinbefore electromagnetic energy induced in wire loop 23, via connector 16 and conductor 18 will be converted by magnetostrictive process to electric vibrational energy at the crystal end surface which latter mentioned energy propagates down the rod length and by the inverse procedure, a portion of the energy is converted to electromagnetic energy and appears, through loop 24, conductor 19, at output connector 17 an output signal. The remainder of the elastic vibrational energy is reflected back to the input face of the crystal. This process continues until all of the energy is either absorbed, scattered or coupled to external circuitry.

The elastic vibrational energy induced by the input electromagnetic energy may be represented as a circularly polarized elastic wave. This principle is discussed by H. Bommel and K. Dranfield in Physical Review Letters, vol. 3, No. 2, pages 83 and 84, July 15, 1959. Maximum output coupling will occur when the wave axis and axes of length of either of the wire loops are parallel. As is well known, in crystals of the type contemplated for use in the invention, the circular wave will rotate about an axis perpendicular to the axis of propagation, that is, about the longitudinal axis of the rod 11. In a typical crystal, rotation will occur at a rate of about 5° per centimeter of length. Therefore, it is possible to prearrange the loops such that maximum coupling will occur after a specific number of reflections, that is at a particular time. For example, assuming the rotation to be 5° per centimeter in a rod one centimeter in length. By rotating the output loop 24 relative to the input loop 23 by 35°, maximum coupling will occur after $7\Delta t$. As shown in FIG. 5, with an input at time $t_0$, only a small portion of the vibrational acoustic energy will be coupled to the output upon arrival at the opposite end surface at time $t_1$ after 5° of rotation. At time $t_3$, the wave having returned to the input and then back to the output crystal surface rotation of an additional 5° for each propagation through the crystal structure occurs for an aggregate rotation of 15°. Finally, at time $t_7$ after 35° of rotation, the wave axis will be parallel to the axis of the wire loop and maximum coupling will occur, resulting in a large output signal at time $t_7$. Also, the amount of rotation per passage is affected by judicious placement of the crystal. This is caused by the acoustogyric effect, which is well known and need not be discussed herein.

In another mode of operation, the input-output terminals may be physically one device since no interaction occurs between polarized waves. FIG. 6 depicts such a device. The connector terminal 16 serves as both an input-output terminal for the delay line and a suitable discriminator or circulator 27 serves to direct the input and output signals. The pole piece 15 may be in intimate contact with the crystal end surface and the cavity 22 may be filled with a dielectric material (not shown).

Obviously, since fine wire loop 23 serves as both an input excitation device for incoming electromagnetic radiations, and as an output device for wave energy from the crystal; the particular time of delay cannot be prearranged by orientation of one loop relative to another loop, as is done in conjunction with the embodiment of FIG. 1. In this embodiment the particular delay time desired is determined by the orientation of the crystal 11, relative to the loop 23 and further by predetermination of a particular biasing flux field.

Many other configurations of permanent magnet may be used in addition to that shown in FIG. 1. FIG. 7 illustrates a rod or bar 11 placed within the air gap of a C-type permanent magnet 13 having re-entry pole pieces 14 and 15. These pole pieces may be placed adjacent to the end surface of the magnet (as shown) or may be cast into the magnet itself. Between and touching the pole piece 14 and the bar or rod 11 is a printed circuit board 51. Similarly, an identical printed circuit board 52 is placed between pole pieces 15 and the crystal 11. The boards 51 and 52 have fastened thereto connectors 16 and 17 respectively, serving as input and output terminals to the device. If a mode of operation like that discussed in conjunction with FIG. 6 is desired, only a single circuit board is utilized and a circulator 27 is necessary. Returning to FIG. 7, the boards 51 and 52 comprise conductive material in the form of a transmission line strip having matching sections 53 to 55. The sections 53 and 55 are of the general shape of a T, while section 54 may be rectangular in shape. Sections 53 to 55 are framed by a rectangular conductive strip 56 which is of substantially the dimensions of the board 51 itself. Dielectric material 57 and 58 sandwiches the conductive strip providing insulation, rigidity and support therefore. The conductive strip may be a solid conductor as shown or may consist of a further dielectric board having a thin conductive material deposited on one or both sides thereof which material is selectively etched away to give the desired configuration. The entire device, after assembly, may be secured in place by mechanical structure, may be epoxied to the magnet, or may be secured in other well known fashions.

As discussed in conjunction with previous embodiments, the delay may be preadjusted by changing the strength of the magnet, orientation of the crystal or by rotating one board relative to the other or by any combination of these factors. Further by changing the configuration of the matching sections or the relationship of one section relative to another, the delay may be changed. For example, if the vertical dimension of section 54 is varied, the effective capacitance of the strip is changed thereby changing the delay of signals in the device. Thus this configuration has the advantage of ease of adjustability.

As in any high frequency application, impedance matching is a consideration for providing maximum coupling efficiency. The dimensions of cavities 21 and 22 affect this coupling and must be precalculated to resonance. In FIGS. 4*a* and 4*b*, fine tuning of the cavity resonance may be adjusted by providing small screws 28 of conductive material such as brass or the like, projecting from a cavity face such as the inner faces of pole pieces 14 and 15. These screws are adjustable prior to complete assembly or after assembly.

Obviously maximum coupling also is affected by placing the wire loops close to or touching the crystal end faces. The loops may touch the end faces so long as compression of the crystal surface does not occur. One technique is to deposit or paint thin strips of metal directly upon the crystal end faces. Another technique shown in FIGS. 8*a* and 8*b* is to etch all but a thin strip of conductor 35 from two metal surfaced dielectric discs 26, place these strips together, and provide access thereto by drilling holes in one of the discs. Thus, mechanical strength and rigidity is enhanced, placement and orientation may be very precise, and an extremely thin wire loop may be utilized.

Thus, a full and complete disclosure has been rendered of a novel miniaturized delay line capable of operation within the microwave frequency band at room temperature, substantially noise and distortion free, and utilizing a permanent magnet thereby providing reliability and durability without the adverse effects of size and weight of prior art devices necessitated by external power and refrigeration equipment.

It should be understood, that the foregoing relates only to a few structural configurations and modes of operation of the invention and various modifications thereof may be resorted to by those skilled in the art, without departing from this scope and spirit of the invention, as herein defined by the appended claims.

What is claimed is:

1. A delay line comprising: a permanent magnet, a ferrimagnetic crystal positioned such that it intersects a region of greatest magnetic flux emanating from said magnet, means for directing substantially all of the fringing flux emanating from said magnet to said crystal, the flux from the permanent magnet being sufficient to bias the crystal to a resonant condition, means for transducing microwave to lower frequency vibrational energy in said crystal with the direction of propagation substantially parallel to the external magnetic field to provide a circularly polarized wave traversing the crystal, and for retransducing a manifestation of said energy from said crystal, and means providing multiple ranges of discrete adjustment of the delay, said means including means for angularly orienting the retransducing means relative to the transducing means to optionally and optimally couple the retransducer to a given one of the wave and reflected echoes thereof traversing the crystal.

2. The delay line of claim 1 wherein said directing means comprises at least one re-entry pole piece.

3. The delay line of claim 2 wherein said transducing means further includes resonant tuning means.

4. The delay line of claim 1 wherein said permanent magnet is of hollow cylindrical shape and said crystal is disposed inside said cylinder.

5. The delay line of claim 1 wherein said permanent magnet is C-shaped and said transducing means and retransducing means have portions projecting beyond the magnet to permit variation of the relative angular orientation between said transducing means and retransducing means.

6. A delay line for microwaves comprising: a cylindrical permanent magnet having an aperture extending therethrough along the longitudinal axis of said cylinder, a rod-shaped yttrium iron garnet crystal of length less than the length of said cylinder within said aperture such that the longitudinal axes of said crystal and said cylinder are coincident, a first and a second re-entry pole piece abutting the faces of said cylinder and of such a configuration so as to define a first and second resonant cavity at the frequency of said microwaves formed by said magnet, said rod, and said first and second pole pieces respectively, transducers disposed in said cavities, each of said pole pieces having an aperture therethrough for coupling to said transducers inside said cavities, and tuning means for adjusting the resonant frequency of each cavity.

7. A delay line comprising: a rod shaped yttrium iron garnet crystal, a cylindrical crystal holder of length less than that of said rod, having an aperture defined therein about the longitudinal axis and having sufficiently large diameter to place said crystal within said holder, a cylindrical permanent magnet having a length greater than that of said rod and having an aperture defined therein about its longitudinal axis and of sufficient diameter to place said rod and holder therein, a first re-entry pole piece placed about the end face of said magnet of a configuration such that a small cavity is defined by a face of said pole pieces, a portion of the interior face of said magnet, the end face of said rod and one end face of said holder; a thin wire conductor placed within said cavity such that its axis of length is perpendicular to the longitudinal axes of said magnet and said rod, one end of said wire electrically grounded to said pole piece, said pole piece having an aperture therethrough of sufficient diameter to accommodate a coaxial center conductor, the other end of said wire electrically connected to such a central conductor.

8. The device of claim 7 wherein said face of said pole piece includes a stepped surface thereby minimizing pole piece magnet contact area.

9. The device of claim 7 wherein said face of said pole piece is of the configuration of the frustrum of a cone thereby minimizing pole piece magnet contact area.

10. A single crystal delay line for delaying microwave signals, comprising a single elongated crystal, a magnet means for directing flux lengthwise through said crystal, transducers at opposite ends of said crystal for transducing and retransducing microwave signals to vibrational waves lengthwise through said crystal having circular polarization whereby multiple internal reflections of the wave from the ends are at different angular orientations relative to one another, and means providing multiple ranges of discrete adjustment of said delay, said means including means for angularly orienting said transducers relative to one another to optimally couple said transducers to a preselected one of the wave and reflected echoes thereof traversing said crystal.

References Cited

UNITED STATES PATENTS

| | | | |
|---|---|---|---|
| 2,850,705 | 9/1958 | Chait et al. | 333—24.3 |
| 2,869,018 | 1/1959 | Brewer et al. | 315—3.5 |
| 2,962,676 | 11/1960 | Marie | 333—24.1 |
| 3,023,384 | 2/1962 | Bowers et al. | 333—24.3 |
| 3,038,131 | 6/1962 | Uebele et al. | 333—24.3 |
| 3,244,993 | 4/1966 | Schloemann | 330—4.6 |
| 3,249,882 | 5/1966 | Stern | 330—4.6 |

OTHER REFERENCES

Strauss: "Proc. IEEE," October 1965, pp. 1484–1495.

Strauss: "IEEE Transactions on Sonics and Ultrasonics," November 1964, pp. 85–89.

ROY LAKE, *Primary Examiner.*

DARWIN R. HOSTETTER, *Examiner.*